(12) United States Patent
Sobradelo Sineiro

(10) Patent No.: US 10,723,305 B2
(45) Date of Patent: Jul. 28, 2020

(54) FIXTURE, SECURING SYSTEM, AIRBAG MODULE AND VEHICLE SAFETY SYSTEM

(71) Applicant: Dalphi Metal Espana S.A., Vigo (ES)

(72) Inventor: Miguel Sobradelo Sineiro, Sisan-Ribadumia (ES)

(73) Assignee: DALPHI METAL ESPANA S.A., Vigo (ES)

( * ) Notice: Subject to any disclaimer, the term of this patent is extended or adjusted under 35 U.S.C. 154(b) by 214 days.

(21) Appl. No.: 15/828,464

(22) Filed: Dec. 1, 2017

(65) Prior Publication Data
US 2018/0170299 A1 Jun. 21, 2018

(30) Foreign Application Priority Data
Dec. 20, 2016 (DE) .................... 20 2016 107 170 U

(51) Int. Cl.
*B60R 21/217* (2011.01)
*B60R 21/213* (2011.01)

(52) U.S. Cl.
CPC ........ *B60R 21/217* (2013.01); *B60R 21/2171* (2013.01); *B60R 21/213* (2013.01)

(58) Field of Classification Search
CPC .. B60R 21/2171; B60R 21/217; B60R 21/213
See application file for complete search history.

(56) References Cited

U.S. PATENT DOCUMENTS

| | | | | |
|---|---|---|---|---|
| 4,315,348 A * | 2/1982 | Oetiker | ................. | B65D 63/02 24/200 W |
| 5,052,082 A * | 10/1991 | Uchman | ................... | F16B 2/08 24/200 W |
| 8,505,962 B2 * | 8/2013 | Henriksson | ............. | F16L 33/02 280/728.2 |
| 8,764,051 B2 * | 7/2014 | Fischer | ............... | B60R 21/2171 280/728.2 |
| 8,820,779 B1 * | 9/2014 | Low | ...................... | B60R 21/232 280/728.2 |
| 9,573,550 B1 * | 2/2017 | Mitchell | ................ | B60R 21/213 |
| 2007/0063489 A1 * | 3/2007 | Dinsdale | ................. | B60R 21/26 280/728.2 |
| 2010/0207364 A1 | 8/2010 | Arima et al. | | |
| 2011/0163521 A1 * | 7/2011 | Gammill | ............. | B60R 21/2171 280/728.2 |
| 2017/0001595 A1 * | 1/2017 | Lang | ......................... | F17C 1/06 |
| 2017/0036640 A1 * | 2/2017 | Tonooka | ................ | B60R 21/261 |
| 2017/0057451 A1 * | 3/2017 | Jinnai | .................. | B60R 21/2171 |
| 2017/0247009 A1 * | 8/2017 | Konaka | ................. | B60R 21/213 |

FOREIGN PATENT DOCUMENTS

EP 2521664 9/2014

* cited by examiner

*Primary Examiner* — Ruth Ilan
(74) *Attorney, Agent, or Firm* — Tarolli, Sundheim, Covell & Tummino LLP

(57) ABSTRACT

The invention relates to a fixture (10), especially a retaining sheet, for an airbag (92) and/or an airbag module, comprising an arm section (15) which includes at least one contact section (30) for a securing element (91), especially for a securing clip or a securing clamp or a securing bracket. In accordance with the invention, at least one boundary area (40) of the contact section (30) which comprises a lateral edge (41) of the arm section (15) has a smaller material thickness (d1) as compared to the residual arm section (15).

29 Claims, 2 Drawing Sheets

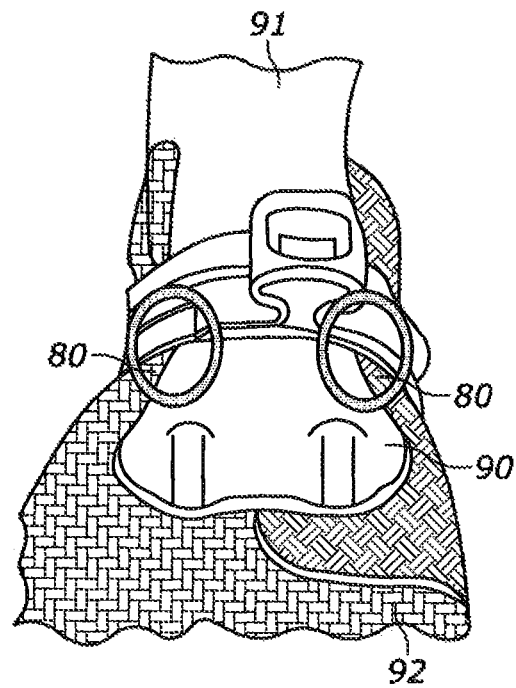
(PRIOR ART)
FIG. 1
FIG. 2A
(PRIOR ART)
FIG. 2B
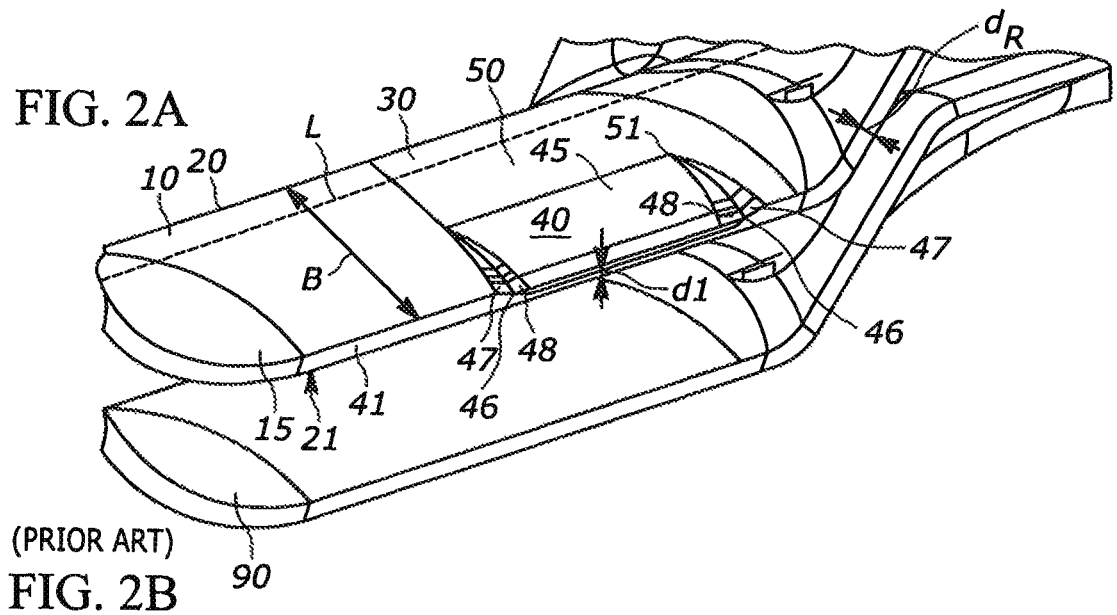

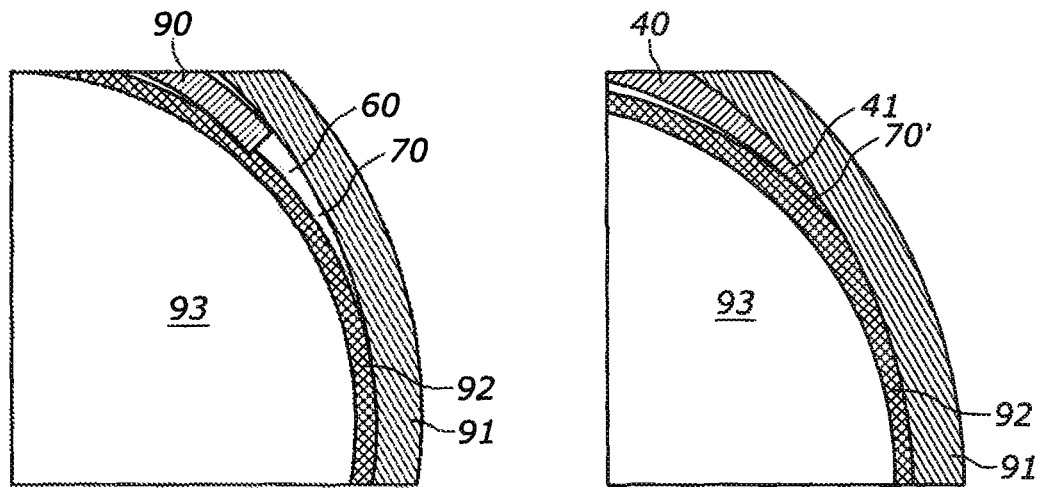
(PRIOR ART)
FIG. 3A
FIG. 3B
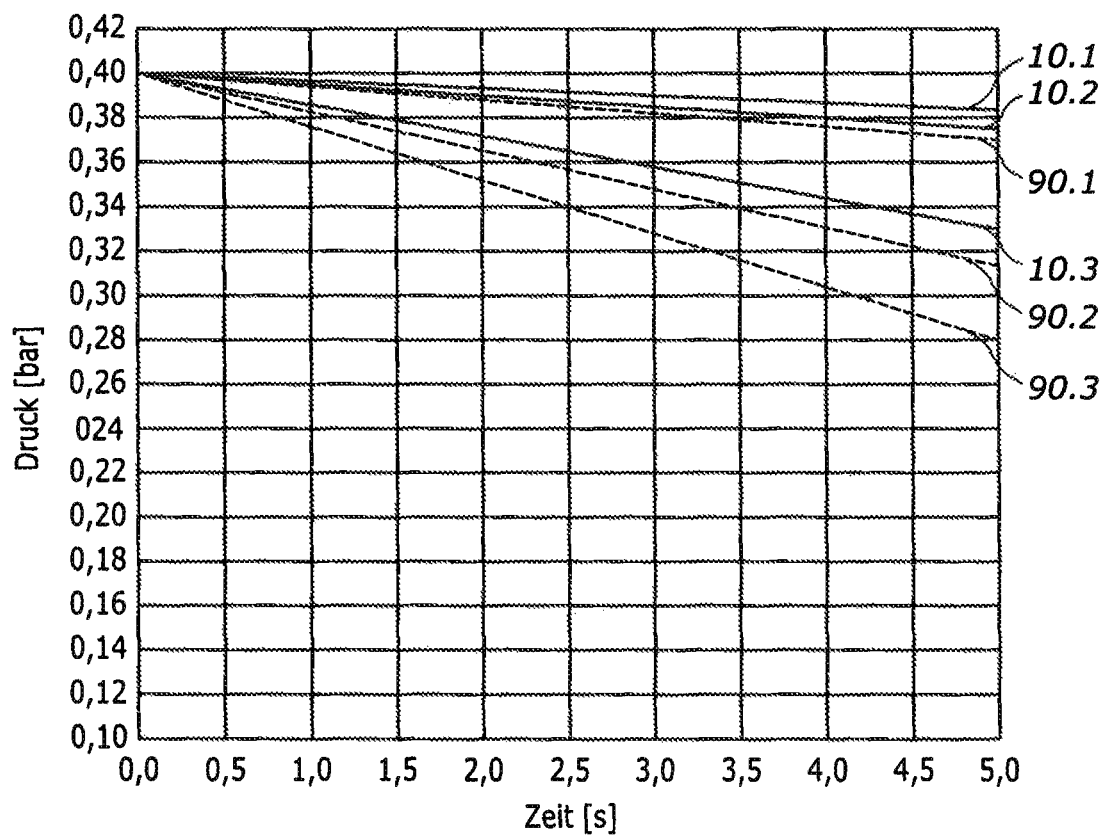
FIG. 4

FIXTURE, SECURING SYSTEM, AIRBAG MODULE AND VEHICLE SAFETY SYSTEM

RELATED APPLICATION

This application claims priority from German Application No. 20 2016 107 170.4, filed Dec. 20, 2016, the subject matter of which is incorporated herein by reference in its entirety.

BACKGROUND OF THE INVENTION

The invention relates to a fixture, especially a retaining sheet, for an airbag and/or an airbag module, comprising an arm section having at least one contact section for a securing element, especially for a securing clip or a securing clamp or a securing bracket. Apart from that, the invention relates to a securing system for an airbag and/or an airbag module. Moreover the invention relates to an airbag module, especially a side airbag module, as well as a vehicle safety system, especially a side airbag system, especially preferred a curtain airbag system.

Fixtures, in particular retaining sheets, for an airbag and/or an airbag module are sufficiently known. Such fixtures and, resp., metal sheets usually have an elongate shape and at least in portions encompass a lengthwise furled airbag and/or a lengthwise designed airbag module.

According to the Federal Motor Vehicle Safety Standard (FMVSS) 226, safety regulations have been issued which are focused on reducing the risk of being thrown out of the vehicle during crash, in particular during rollover. This regulation requires especially the side window openings of cars being secured by appropriate restraint measures so that occupants cannot move outwards further than predetermined. For example, this regulation stipulates inflating times for airbags. The head of a vehicle occupant should contact an airbag within a time period of from 1.5 seconds to 6 seconds, for example. Within this period of time sufficient pressure has to be guaranteed inside an airbag.

It is a drawback when the gas flowing into the airbag flows out of the airbag at an inappropriate position or wrong segments of the airbag are inflated. It is Imaginable that airbags and, resp., airbag modules may have leakages in the area of the fixture or, resp., the fastening. Especially in the connecting area of a fixture, especially of a retaining sheet, to a fastening element occasionally leakages have been found during inflation tests in a laboratory.

FIG. 1 illustrates such leakages 80. They are formed below a securing clip 91. In particular, the leakages 80 are found in the transition area from the retaining sheet 90 to the airbag 92. In these areas a gap or a section is formed between the securing clip 91 and the surface of the airbag 92 so that gas may escape at this position.

SUMMARY OF THE INVENTION

It is the object of the present invention to state a fixture, in particular a retaining sheet, for an airbag and/or for an airbag module which is further developed so that the occurrence of leakages is reduced and preferably prevented. It is another object to state a securing system for an airbag and/or an airbag module. Moreover, the object of the invention consists in stating an airbag module as well as a vehicle safety system comprising a further developed fixture.

The fixture according to the invention, in particular the retaining sheet according to the invention, relates to a fixture, especially to a retaining sheet for an airbag and/or an airbag module, comprising an arm section which includes at least one contact section for a securing element, especially for a securing clip or a securing clamp or a securing bracket. In accordance with the invention, at least a rim area of the contact section comprising a lateral edge of the arm section has a material thickness which is smaller as compared to the residual arm section.

The arm section of the fixture may be an elongate plate-shaped element. The arm section may be formed to be bent especially about the longitudinal axis of the arm section. In or at said, preferably bent, arm section a furled and/or folded airbag and/or an airbag module has to be placed. It is possible that the fixture includes plural arm sections, especially two arm sections. Preferably a mounting section is formed between two arm sections. On said mounting section the fixture, in particular the retaining sheet, can be mounted to a vehicle, in particular to a body part of the vehicle.

A securing clip and/or a securing clamp and/or a securing bracket may serve or be configured as securing element. It is possible that plural contact sections for a securing element are formed on an arm section. It is further possible that, when plural arm sections are configured, also plural contact sections for securing elements are formed.

A contact section of the arm section is the portion of the arm section on which and/or to which the securing element is adjacent in the mounted state. The contact section of the arm section thus marks the position of a securing element. Configuring a contact section which has a different geometry and/or different shape as compared to the residual arm section serves for visualizing the correct position for arranging a securing element. In this way, a fitter has a predetermined mounting position for a securing element on an arm section of a fixture.

The contact section is preferably configured perpendicularly to a longitudinal axis of the arm section. Preferably the contact section is formed over the entire width of an arm section. The width is meant to be the connection of the respective two elongate lateral edges of an arm section. Hence the contact section includes two boundary areas. A boundary area of a contact section preferably comprises a portion of a lateral edge of the arm section. The boundary area of a contact section and, resp., a boundary area of a contact section is understood to be a segment of the contact section which is formed starting from the lateral edge in the direction of the longitudinal axis of the arm section.

At least one boundary area of the contact section has a smaller material thickness than the residual arm section. In other words, the material thickness is reduced in the boundary area of the contact section vis-à-vis the residual arm section. It is possible that the complete contact section has a smaller material thickness as compared to the residual arm section. In another embodiment of the invention, it is possible that the contact section has a smaller material thickness in two boundary areas or in both boundary areas and has no reduced material thickness in a central section formed in the area of the longitudinal axis of the arm section.

The central section of the contact section may have a material thickness corresponding to the residual arm section. In still another embodiment of the invention it is possible that the central section of the contact section has a smaller material thickness as compared to the residual arm section, but has a larger material thickness as compared to at least one boundary area of the contact section.

Thus a contact section may consist of at least three sections. A central section is preferably formed between two boundary areas.

In another embodiment of the invention it is possible that at least in one boundary area of the contact section an inclined plane is formed which extends tilted toward the lateral edge. The inclined plane extends to be sloping toward the lateral edge starting from the central section of the contact section.

The smaller material thickness in at least one boundary area of the contact section causes the distance between the securing element and the airbag and/or airbag module to be reduced in the transition area from the contact section to a retained airbag and/or to a retained airbag module. In an especially preferred embodiment of the invention, between the securing element and the airbag and/or the airbag module no distance is formed in the transition area. In this embodiment, the securing element is adjacent to the airbag and/or the airbag module even in the transition area. By reducing the distance or by forming no distance according to the invention leakages are reduced and, resp., no leakages are formed so that the inflation of the airbag primarily in the initial phase shortly after activation of the airbag module is stable and sufficient gas pressure is provided in the airbag.

The boundary area of a contact section may include, at least in portions, a wedge-shaped cross-section, wherein preferably the lateral edge of the arm section forms a wedge point. The wedge point may be acute or blunt or may be a straight edge.

In a preferred embodiment of the invention, at least two boundary areas of the contact section have a smaller material thickness vis-à-vis the residual arm section. The material thickness of the contact section may vary in the boundary area. Preferably, the material thickness continuously decreases in the boundary area starting from the central section toward the lateral edge of the arm section.

It is an option that two boundary areas are formed symmetrically relative to the longitudinal axis of the arm section. This entails a facilitated manufacturing process. Since also securing clips or securing clamps or securing brackets are configured to be slightly symmetrical, it is beneficial to design also two boundary areas of the contact section to be symmetrical to the longitudinal axis of the arm section.

At least one boundary area, preferably at least two boundary areas, of the contact section may be in the form of a recess, especially of a notch and/or embossing. In other words, at least one boundary area, especially at least two boundary areas, may be formed by means of a notching and/or embossing process in the arm section.

The fixture, in particular the arm section, has an upper side and a lower side. The lower side is the side which later will contact an airbag and/or an airbag module. The upper side is the side of the fixture which does not contact an airbag and/or an airbag module. The at least one boundary area is preferably incorporated or formed in the upper side of the fixture. Due to the design as a recess, especially as a notch and/or embossing, merely the upper side of the fixture is machined and, resp., modified as regards its structure. The lower side of the fixture, in particular the lower side of the contact section, is not machined or modified as regards the structure, on the other hand.

The contact section may have two flattened and/or shouldered and/or stepped side contours in the at least one boundary area. The side contours extend approximately in the vertical extension with respect to the lateral edge. Said side contours facilitate mounting of a securing element on the contact section. Moreover, a flattened and/or shouldered and/or stepped side contour causes a reduction of tension at the fixture in the area of the contact section.

Within the scope of an independent aspect, the invention is based on the idea to state a securing system for an airbag and/or an airbag module, the securing system comprising a fixture according to the invention and at least one securing clip and/or at least one securing clamp and/or at least one securing bracket. The securing element, i.e. the securing clip and/or the securing clamp and/or the securing brackets is preferably made from a sheet metal strip. Depending on the geometry as well as on the extension around the airbag and/or the airbag module, either a securing clip and/or a securing clamp and/or a securing bracket is formed.

The securing clip and/or the securing clamp and/or the securing bracket is/are mounted preferably in a leak-tight manner to the contact section of the fixture. The leak-tight mounting may be achieved by designing the fixture in accordance with the invention, especially by forming the contact section. By forming contact sections with differently designed boundary areas moreover the mounting positions for the securing element, in particular for the securing clip and/or the securing clamp and/or the securing bracket, are marked.

Within the scope of another independent aspect, the invention is based on the idea to provide an airbag module, especially a side airbag module, comprising a fixture according to the invention and/or comprising a securing system according to the invention.

The airbag module, especially the side airbag module, preferably comprises a (folded and/or furled) airbag and a gas generator for inflating the airbag, wherein the airbag module is preferably secured with the aid of the fixture according to the invention and/or with the aid of the securing system according to the invention to a vehicle, especially to a vehicle body.

Preferably, the airbag is connected to the fixture, in particular by a clamp, e.g. a hose clamp or Oetiker clamp. In particular, the clamp pinches the fixture onto the airbag which surrounds a portion of the gas generator, preferably an outlet opening of the gas generator.

The gas generator of the airbag module may be a tubular gas generator, for example, with the longitudinal axis of the gas generator being oriented in parallel to the furled or folded airbag. Consequently, an airbag module, especially a side airbag module, can be provided in an especially space-saving form.

Under another independent aspect, the invention relates to a vehicle safety system, especially a side airbag system, especially preferred a curtain airbag system, comprising a fixture according to the invention and/or comprising a securing system according to the invention and/or comprising an airbag module according to the invention. Hence a vehicle safety system according to the invention includes a fixture according to the invention and/or a securing system according to the invention and/or an airbag module according to the invention.

Besides, this vehicle safety system comprises at least one sensor unit for sensing data as well as an electronic decision-making unit which is suited to define the presence of a trigger case for the airbag module and/or to send a trigger signal to the airbag module taking the data sensed by the sensor unit into account.

Advantages similar to those explained already in connection with the fixture described in the beginning and/or with the securing system according to the invention are resulting.

BRIEF DESCRIPTION OF THE DRAWINGS

Hereinafter, the invention shall be illustrated in detail by way of embodiments with reference to the enclosed schematic drawings. Further features and advantages of the invention will be resulting from the following description in combination with said drawings, wherein:

FIG. 1 shows leakages formed below a securing clip in the transition area from a retaining sheet to an airbag.

FIG. 2a shows a fixture according to the invention;

FIG. 2b shows a fixture known from prior art;

FIG. 3a shows a section across an airbag module known from prior art;

FIG. 3b shows a section across the airbag module according to the invention; and FIG. 4 shows a comparison of gas pressures in inflated airbags comprising a fixture according to the invention and a standard fixture.

DESCRIPTION

Hereinafter like reference numerals are used for like and equally acting parts.

FIG. 2a shows a fixture 10 according to the invention. FIG. 2b shows a known or standard retaining sheet 90.

The fixture 10 comprises an arm section 15. In FIG. 2a merely a portion of the arm section 15 is shown. The arm section 15 is characterized in that the extension along the longitudinal axis L is larger than the width B of the arm section 15. The arm section 15 is bent about the longitudinal axis L. That is to say that in the widthwise extension a curve is formed in the arm section 15.

In FIG. 2a the upper side 20 of the fixture 10 is evident. To the lower side 21 at least a portion of the airbag is adjacent in the mounted state. In the arm section 15 a contact section 30 is configured. Said contact section 30 serves for securing and, resp., for mounting a securing element. That is to say that in the contact section 30 the securing element is adjacent to the upper side 20 of the arm section 15.

Equally evident is a boundary area 40 of the contact section 30. The boundary area 40 includes a recess, especially an embossing. The boundary area 40 comprises a section of the lateral edge 41. A central section 50 is adjacent to the boundary area 40 of the contact section 30. In the central section 50 no notch and/or embossing and/or material recess is formed. On the opposite side of the arm section, i.e. behind the central section 50, a second boundary area 40 is formed on the further side of the contact section 30 which cannot be seen here, wherein this boundary area 40 is preferably configured to be symmetrical to the longitudinal axis L of the arm section 15.

The boundary area 40 of the contact section 30 has a material thickness d1. Said material thickness d1 is less than the material thickness dR of the residual arm section 15. The material thickness dR of the residual arm section 15 is preferably uniform or approximately uniform over the entire arm section. In the mounted state a securing clip 91 is provided on the contact section 30, especially on the boundary area 40 of the contact section 30. The boundary area 40 has an inclined plane 45 which extends tilted in the direction of the lateral edge 41. The material thickness d1 of the boundary area 40 is thus not formed to be of uniform thickness over the entire boundary area. The material thickness d1 decreases starting from the bordering edge 51 which constitutes the transition from the central section 50 to the boundary section 30 in the direction of the lateral edge 41.

The lower side 21 has no material recess, especially no notch and/or embossing. The lower side 21 is configured to be more or less flat.

The boundary area 40 further includes two specifically shaped side contours 46. Due to the side contour faces 47 and 48 a stepping is resulting. Thus, in an adjacent securing element the mechanical tension in the boundary area 40 is reduced. Moreover, the securing element, especially the securing clip, can be inserted more easily into the boundary area 40 of the contact section 30.

FIG. 3a illustrates the section across a known airbag module. FIG. 3b illustrates the cross-section of an airbag module according to the invention.

The known retaining sheet 80 has a uniform material thickness over the entire cross-section. In the transition area 80, i.e. in the area in which the retaining sheet 90 ends and the securing clip 91 is intended to abut on the airbag 92, a gap 70 is thus resulting. In the gap 70 gas may escape so that a leakage 80 is formed in the area of the gap 70.

As is shown in FIG. 3b, the boundary area 40 of the contact section 30 may at least in portions have a wedge-shaped cross-section, with the lateral edge 41 forming the wedge point. The material thickness d1 of the boundary area 40 decreases toward the lateral edge 41. Therefore, the securing clip 91 may be more closely adjacent to the airbag 92. That is to say that in the transition area 60 no gap or merely a very small gap 70s is formed. The more pointed the wedge-shaped cross-section, the smaller the gap 70'. In this way, the occurrence of leakages is reduced with the aid of the fixture according to the invention.

In FIG. 4 measuring results representing the pressure inside an airbag in the course of the activation time are shown. The graphs 10.1, 10.2 and 10.3 illustrate airbags comprising a fixture according to the invention. The graphs 90.1, 90.2 and 90.3 illustrate the pressure/time curve of the same airbags comprising standard fixtures. The airbag 10.1 corresponds to the airbag 90.1. The airbag 10.2 corresponds to the airbag 90.2 and the airbag 10.3 corresponds to the airbag 90.3.

Consequently, it can be inferred from the graphs of FIG. 4 that in an airbag comprising the fixture according to the invention as compared to the airbag of equal designed but comprising a standard fixture an improved pressure curve will be resulting. That is to say that the pressure inside the airbag can be maintained for a longer period of time with the aid of a fixture according to the invention.

It is pointed out in this context that all afore-described parts considered per se and in any combination, especially the details illustrated in the drawings, are claimed to be essential for the invention. Variations herefrom are known to those skilled in the art.

LIST OF REFERENCE NUMERALS 10 fixture
15 arm section
20 upper side
21 lower side
30 contact section
40 boundary area
41 lateral edge
45 inclined plane
46 side contour
47 side contour face
48 side contour face
50 central section
51 bordering edge
60 transition area
70,70' gap
80 leakage
90 retaining sheet (prior art)
91 securing clip 92 airbag
93 gas generator
B width
L longitudinal axis
d1 material thickness boundary area
dR material thickness residual arm section

The invention claimed is:

1. A fixture (10) for at least one of an airbag (92) and an airbag module, comprising an arm section (15) including at least one contact section (30) for a securing element (91), wherein at least a boundary area (40) of the contact section (30) comprising at least a portion of a lateral edge (41) of the arm section (15) has a smaller material thickness (d1) as compared to the residual arm section (15), the at least one boundary area (40) having longitudinal ends each connected to the residual arm section (15) by side contour faces (47, 48) extending transversely between the boundary area (40) and the residual arm section (15).

2. The fixture (10) according to claim 1, further comprising an inclined plane (45) formed in portions at least in the boundary area (40) which extends tilted in the direction of the lateral edge (41).

3. The fixture (10) according to claim 1, wherein the boundary area (40) at least in portions has a wedge-shaped cross-section, wherein the lateral edge (41) forms a wedge point.

4. The fixture (10) according to claim 1, wherein the at least one boundary area (40) comprises at least two boundary areas (40) of the contact section (30) each having a material thickness (d) which is smaller as compared to the residual arm section (15).

5. The fixture (10) according to claim 4, wherein the at least one boundary area (40) comprises two boundary areas (40) formed symmetrically to the longitudinal axis (L) of the arm section (15).

6. The fixture (10) according to claim 1, wherein the at least one boundary area (40) of the contact section (30) is in the form of a recess.

7. The fixture (10) according to claim 6, wherein the at least one boundary area (40) of the contact section (30) is in the form of at least one of a notch and an embossing.

8. A securing system for at least one of an airbag (92) and an airbag module, comprising a fixture (10) according to claim 1, and at least one of a securing clip, at least one securing clamp, and at least one securing bracket.

9. The securing system according to claim 8, wherein at least one of the securing clip, the securing clamp, and the securing bracket is mounted on the contact section (15) of the fixture (10) in a leak-tight manner.

10. An airbag module comprising a securing system according to claim 8, an airbag (92), and a gas generator (93) for inflating the airbag, wherein the airbag is secured by the fixture (10) to the gas generator.

11. The airbag module according to claim 10, wherein the airbag is secured by the fixture to an outlet opening of the gas generator.

12. A vehicle safety system comprising the airbag module of claim 10, at least one sensor unit for sensing data, and an electronic decision-making unit suited to define the presence of an airbag trigger case and/or to send an airbag trigger signal taking the data sensed by the sensor unit into account.

13. The airbag module according to claim 10, wherein the airbag comprises at least one of a side airbag and a curtain airbag.

14. A vehicle safety system comprising an airbag module according to claim 10, at least one sensor unit for sensing data, and an electronic decision-making unit suited to define the presence of an airbag trigger case and/or to send an airbag trigger signal taking the data sensed by the sensor unit into account.

15. The vehicle safety system according to claim 14, wherein the airbag comprises at least one of a side airbag and a curtain airbag.

16. A vehicle safety system comprising a securing system according to claim 8, at least one sensor unit for sensing data, and an electronic decision-making unit suited to define the presence of an airbag trigger case and/or to send an airbag trigger signal taking the data sensed by the sensor unit into account.

17. The vehicle safety system according to claim 16, wherein the airbag comprises at least one of a side airbag and a curtain airbag.

18. The fixture of claim 1, where in the securing element (91) comprises at least one of a securing clip, a securing clamp, and a securing bracket.

19. The fixture (10) according to claim 1, wherein the at least one boundary area (40) comprises at least two boundary areas (40) of the contact section (30) in the form of a recess.

20. The fixture (10) according to claim 1, wherein the at least one boundary area (40) comprises at least two boundary areas (40) of the contact section (30) in the form of at least one of a notch and an embossing.

21. An airbag module comprising a fixture (10) according to claim 1, an airbag (92), and a gas generator (93) for inflating the airbag, wherein the airbag is secured by the fixture (10) to the gas generator.

22. The airbag module according to claim 21, wherein the airbag is secured by the fixture to an outlet opening of the gas generator.

23. The airbag module according to claim 21, wherein the airbag comprises at least one of a side airbag and a curtain airbag.

24. A vehicle safety system comprising the airbag module of claim 21, at least one sensor unit for sensing data, and an electronic decision-making unit suited to define the presence of an airbag trigger case and/or to send an airbag trigger signal taking the data sensed by the sensor unit into account.

25. A vehicle safety system comprising a fixture (10) according to claim 1, at least one sensor unit for sensing data, and an electronic decision-making unit suited to define the presence of an airbag trigger case and/or to send an airbag trigger signal taking the data sensed by the sensor unit into account.

26. The vehicle safety system according to claim 25, wherein the airbag comprises at least one of a side airbag and a curtain airbag.

27. The fixture (10) according to claim 1, wherein the side contour faces (47, 48) are flattened.

28. The fixture (10) according to claim 1, wherein the side contour faces (47, 48) are stepped.

29. The fixture (10) according to claim 1, wherein the side contour faces (47, 48) are shouldered.

* * * * *